United States Patent
Matsubara et al.

[11] Patent Number: 6,060,148
[45] Date of Patent: May 9, 2000

[54] CERAMIC HONEYCOMB STRUCTURAL BODY

[75] Inventors: Reiji Matsubara, Aichi-Gun; Koichi Ikeshima, Okazaki, both of Japan

[73] Assignee: NGK Insulators, Ltd., Japan

[21] Appl. No.: 09/047,526

[22] Filed: Mar. 25, 1998

[30] Foreign Application Priority Data

Mar. 28, 1997 [JP] Japan ................................. 9-077587

[51] Int. Cl.$^7$ ....................................................... B32B 9/00
[52] U.S. Cl. ........................... 428/116; 428/117; 428/118
[58] Field of Search .................................. 428/116, 117, 428/118

[56] References Cited

U.S. PATENT DOCUMENTS

| | | | |
|---|---|---|---|
| 4,041,597 | 8/1977 | Folmar et al. | 428/116 X |
| 4,233,351 | 11/1980 | Okumura et al. | 428/116 X |
| 5,761,787 | 6/1998 | Kragle et al. | 428/116 X |
| 5,820,836 | 10/1998 | Morlec et al. | 428/116 X |

FOREIGN PATENT DOCUMENTS

| | | |
|---|---|---|
| 57-6722 | 1/1982 | Japan . |
| 61-60320 | 12/1986 | Japan . |
| 62-18797 | 4/1987 | Japan . |
| 5-41296 | 6/1993 | Japan . |

OTHER PUBLICATIONS

Patent Abstracts of Japan; vol. 095, No. 008; Sep. 29, 1995 & JP 07 124428 A (Noritake Co Ltd); May 16, 1995 *FIGS. 1,3,5*.

Patent Abstracts of Japan; vol. 005, No. 020 (C–042); Feb. 6, 1981 & JP 55 147154 A (NGK Spark Plug Co Ltd); Nov. 15, 1980 *abstract FIG. 2*.

Patent Abstracts of Japan; vol. 012, No. 103 (C–485); Apr. 5, 1988 & JP 62 234552 A (Mitsubishi Heavy Ind Ltd; Others: 01): Oct. 14, 1987 *abstract; figures*.

Primary Examiner—Timothy M. Speer
Attorney, Agent, or Firm—Parkhurst & Wendel, LLP

[57] ABSTRACT

A ceramic honeycomb structural body comprises a plurality of open-ended cells defined by an outer peripheral wall and many cell walls, wherein cell walls constituting the irregular open-ended cells located near to the outer peripheral wall have a thickness thicker than those of the other remaining cell walls.

4 Claims, 6 Drawing Sheets

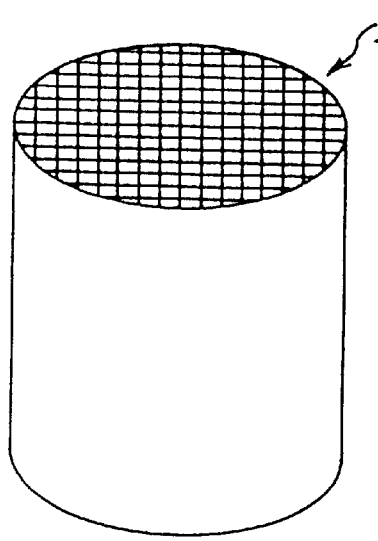
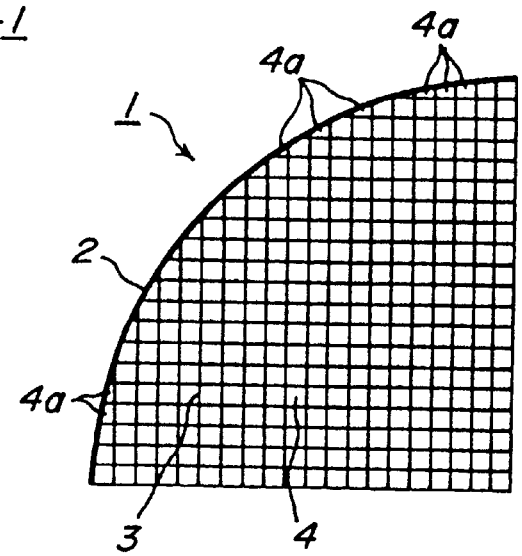
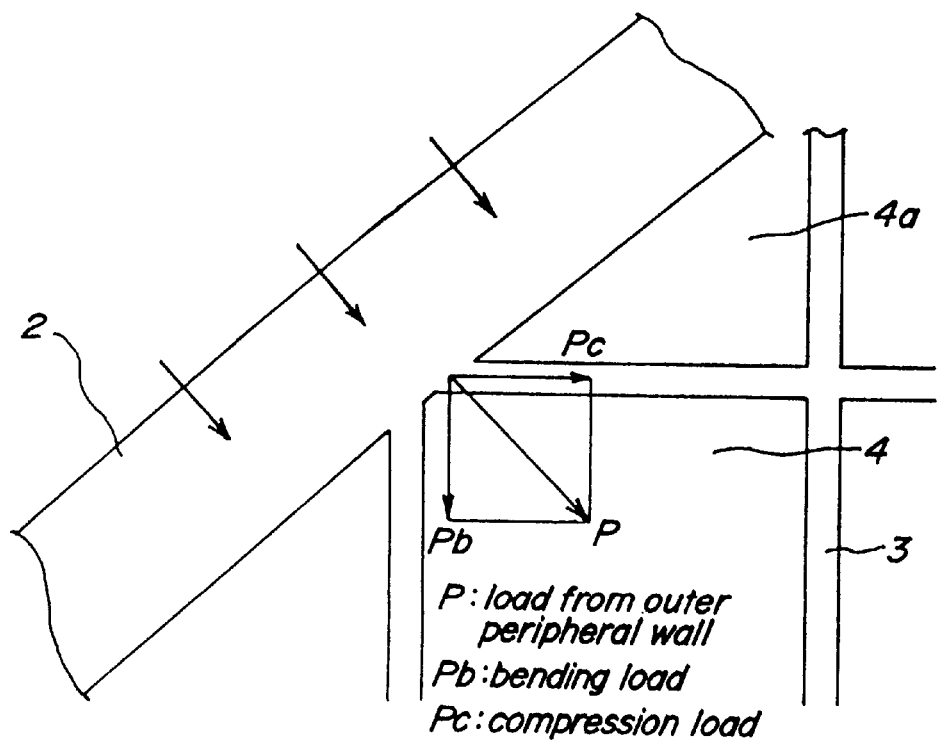
P: load from outer peripheral wall
Pb: bending load
Pc: compression load

FIG. 3
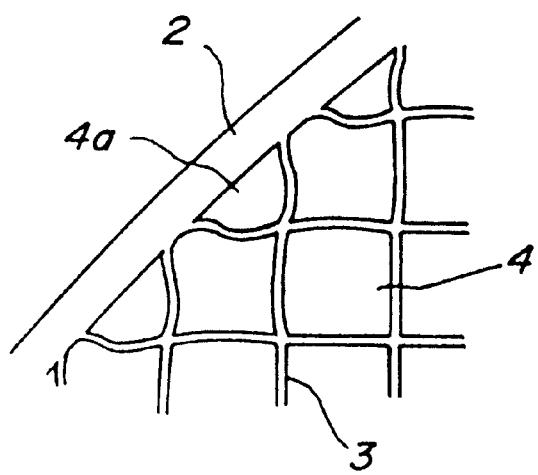
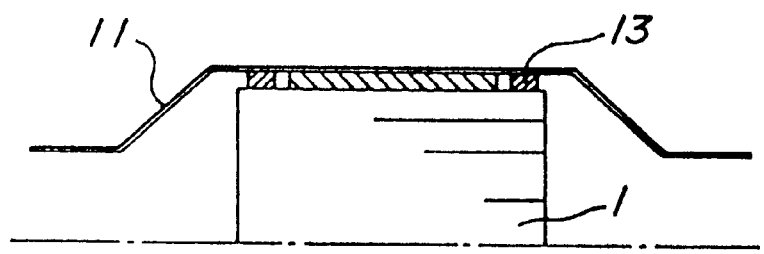
FIG. 4a
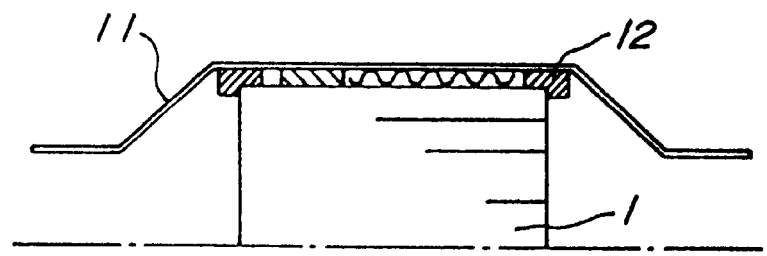
FIG. 4b

FIG_6

Open-ended cell having sectional area of not less than 80%

Open-ended cell having a sectional area of less than 80%

A : position for measuring cell wall thickness of irregular open-ended cell

B : position for measuring cell wall thickness of open-ended cell other than irregular open-ended cell C : position for measuring thickness of outer peripheral wall

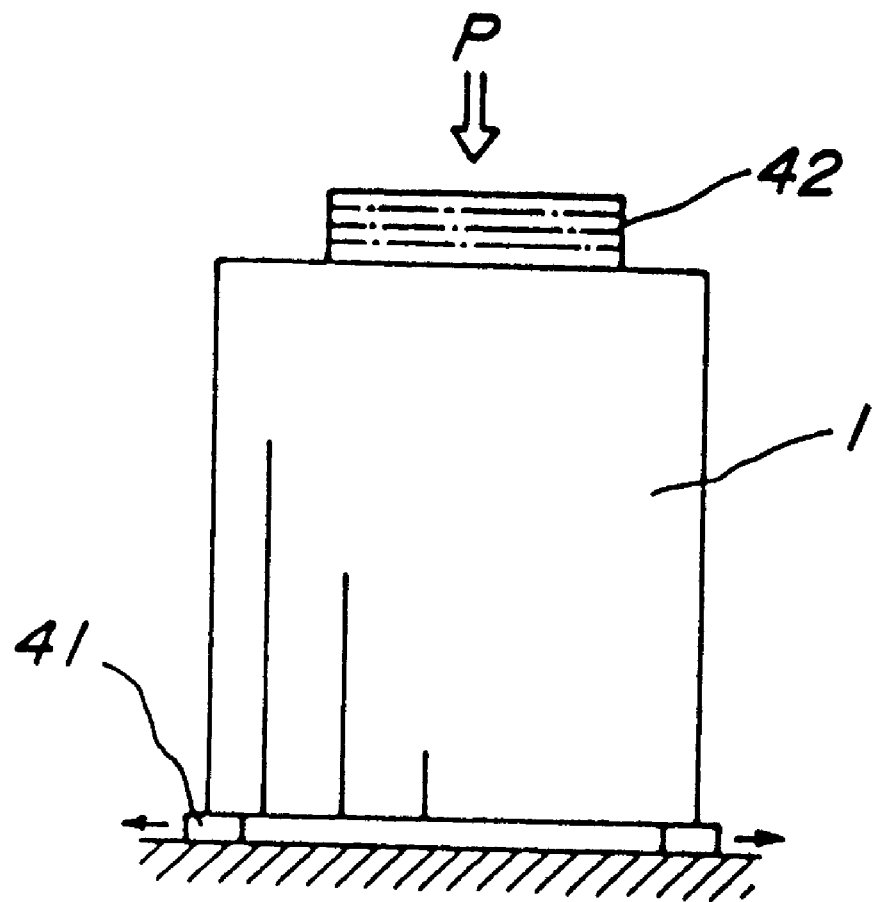

CERAMIC HONEYCOMB STRUCTURAL BODY

BACKGROUND OF THE INVENTION

1. Field of the Invention

This invention relates to a ceramic honeycomb structural body used for a catalyst purifying harmful components such as hydrocarbon, carbon monoxide and nitrogen oxides included in an exhaust gas discharged from an internal combustion engine of automobile or the like, or a catalyst purifying various harmful components discharged from a boiler, and more particularly to a ceramic honeycomb structural body having a plurality of open-ended cells defined by thin cell walls.

2. Description of Related Art

The ceramic honeycomb structural body having a plurality of open-ended cells defined by a cylindrical hollow-shaped outer wall and many cell walls is used from the old time as a support for the catalyst purifying harmful components such as hydrocarbon, carbon monoxide and nitrogen oxides included in an exhaust gas discharged from an internal combustion engine of automobile or the like, or the catalyst purifying various harmful components discharged from a boiler. The development of such a ceramic honeycomb structural body traces the history of thinning the thickness of the cell wall from early time of development up to now.

As the thickness of the cell wall becomes thinner, the mechanical strength of the ceramic honeycomb structural body lowers, so that there are proposed various techniques for solving this problem. In general, it can be considered that if the mechanical strength is born only by the outer peripheral wall of the ceramic honeycomb structural body, the cell walls inside the structural body can freely be thinned. However, the materials constituting the ceramic honeycomb structural body are actually limited from a viewpoint of heat resistance and thermal shock resistance, and also the thickness of the outer peripheral wall is limited to not less than about 1.5 mm from restriction in the production, so that the mechanical strength required for the ceramic honeycomb structural body could not be obtained only by the outer peripheral wall.

For this end, JP-B-62-18797 and JP-B-61-60320 disclose a technique wherein the thickness of all cell walls existing in the outer peripheral portion of the ceramic honeycomb structural body is thickened and the thickness of the cell wall inside the structural body is thinned for preventing the lowering of the mechanical strength. According to this technique, however, since the thickness of the cell wall existing in the outer peripheral portion of the ceramic honeycomb structural body is thickened, the mechanical strength can be developed, but there is caused a problem that it becomes difficult to flow the exhaust gas in open-ended cells in the vicinity of the thick cell wall in the outer peripheral portion.

Further, JP-B-5-41296 discloses a technique wherein a thickness of a cell wall contacting with the outer peripheral wall of the ceramic honeycomb structural body having a rectangular shape at lateral section is gradually increased toward the outer peripheral wall. This technique is a technique applicable only to an extremely limited condition or a condition that the outer peripheral wall of the ceramic honeycomb structural body having a rectangular shape is formed by slits in an extrusion die and hence a dimensional tolerance of the outer peripheral shape is very loose. Therefore, there is caused a problem that the above technique cannot be applied to the catalyst for the automobile as it is.

SUMMARY OF THE INVENTION

It is, therefore, an object of the invention to solve the aforementioned problems of the conventional techniques and to provide a ceramic honeycomb structural body preventing the lowering of the strength, being economical and high in the accuracy and flowing an exhaust gas in open-ended cells in the vicinity of the outer peripheral wall when it is used as a support for the catalyst.

According to the invention, there is the provision of a ceramic honeycomb structural body comprising a plurality of open-ended cells defined by an outer peripheral wall and many cell walls, the improvement wherein cell walls constituting the irregular open-ended cells located near to the outer peripheral wall have a thickness thicker than those of the other remaining cell walls.

According to the invention, the cell walls constituting the irregular open-ended cells in the vicinity of the outer peripheral wall are made thicker than the other remaining cell walls and particularly the thickness of the cell wall in the irregular open-ended cell not crossing in a direction perpendicular to the outer peripheral wall is made thick, whereby bending stress applied to the cell wall can be mitigated and hence it is possible to prevent the breakage of the ceramic honeycomb structural body at a low level. Furthermore, the deformation of the cell wall constituting the irregular open-ended cell by pressure applied from the outer peripheral wall can be prevented in the manufacture of the ceramic honeycomb structural body. And also, even if the cell wall constituting the irregular open-ended cell is made thick, the pressure loss is hardly influenced.

BRIEF DESCRIPTION OF THE DRAWINGS

The invention will be described with reference to the accompanying drawings, wherein:

FIG. 1a is a perspective view of an embodiment of the ceramic honeycomb structural body to be noticed in the invention;

FIG. 1b is a partial sectional view of the structural body shown in FIG. 1a;

FIG. 2 is a schematic enlarged view illustrating compression load and bending load applied to a cell wall;

FIG. 3 is a partial schematic enlarged view illustrating the deformation of the cell wall;

FIGS. 4a and 4b are partly broken elevation views of embodiments illustrating a construction of a catalyst converter using the honeycomb structural body, respectively;

FIG. 8 is a schematic view illustrating a method of measuring the strength of the outer peripheral wall in the example.

DESCRIPTION OF PREFERRED EMBODIMENTS

Figure 5:
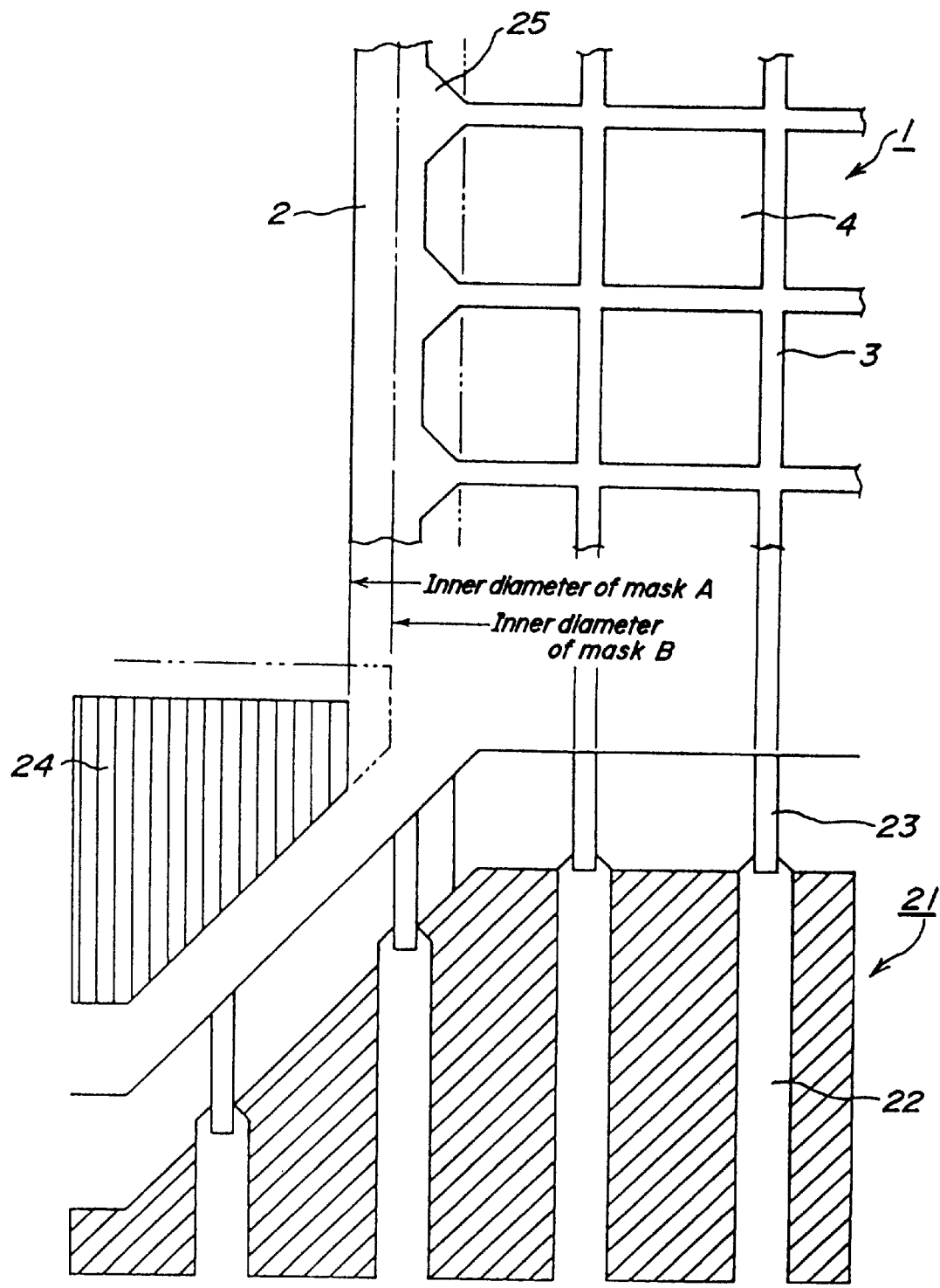
FIG. 5 is a partial schematic view of an embodiment of an extrusion die usable for the extrusion of the ceramic honeycomb structural body according to the invention.

The details of attaining the invention will be described below.

Recently, social demands for automobiles become higher and higher, and there are mentioned the following two demands with respect to the catalyst among them.

(1) The harmful components in the exhaust gas are rendered into zero as far as possible.

(2) The fuel consumption is reduced as far as possible.

As to these demands, a practicable remedy for the ceramic honeycomb structural body is to make the thickness of the cell wall thin as mentioned below.

At present, catalysts are widely used as means for decreasing harmful components in the exhaust gas. One of conditions of the ceramic honeycomb structural body contributing to improve the purification performance of the catalyst is a point that a heat capacity is decreased for rapidly raising the temperature of the catalyst to a working start temperature. Various methods of decreasing the heat capacity of the ceramic honeycomb structural body can be thought, but they are actually restricted as mentioned below. Firstly, it is thought to use a material having a small heat capacity, but the material is rather limited by the other important properties such as mechanical strength, heat resistance, thermal shock resistance and the like, so that the heat capacity of the structural body cannot be decreased by such a material. Secondly, it is thought to increase a porosity, but the increase of the porosity lowers the mechanical strength, so that it is impossible to increase the porosity. Thirdly, it is thought to decrease the number of cell walls, but since the purification performance of the catalyst is proportional to the geometric surface area of the structural body, it is impossible to decrease the number of open-ended cells defined by the cell walls. For these reasons, means for decreasing the heat capacity of the ceramic honeycomb structural body is only the thinning of the thickness of the cell wall.

On the other hand, it is considered that a pressure-drop of the ceramic honeycomb structural body is minimized in order to reduce the fuel consumption. In order to minimize the pressure drop under a condition of ensuring the geometric surface area required for the purification performance, it is a best means to thin the cell walls of the ceramic honeycomb structural body.

As mentioned above, the thinning of the thickness in the cell walls of the ceramic honeycomb structural body is a means for fulfilling the above-mentioned requirements. However, when the thickness of the cell wall is thinned, the mechanical strength may naturally be lowered as a result.

The mechanical strength of the ceramic honeycomb structural body is a strength strongly and mechanically holding the structural body from external pressure even if the structural body is used as a support for the catalyst in an automobile and subjected to high heat and violent vibrations. That is, the ceramic honeycomb structural body is cool in a catalyst converter at the time of starting the automobile, so that a thermal expandible ceramic mat is interposed between a container for the catalyst converter and the structural body at a compressed state so as not to freely move the structural body inside the container even when vibrations are applied to the catalyst converter at the starting time. Then, when the catalyst converter is heated by heat from the exhaust gas during the running of the automobile, the thermal expansible ceramic mat is expanded to further increase pressure applied to the structural body. Therefore, the ceramic honeycomb structural body is required to have a mechanical strength durable to these pressures, and the required strength is usually not less than 1 MPa.

The inventors have noticed that the breakage of the usual ceramic honeycomb structural body having a circular or ellipsoidal shape at lateral section and including square open-ended cells defined by cell walls having a uniform thickness is almost caused in a position of the cell wall not perpendicular to the outer peripheral wall at a low level of mechanically external pressure. FIGS. 1a and 1b are a perspective view and a partial sectional view of the ceramic honeycomb structural body having the above structure. In FIGS. 1a and 1b, numeral 1 is a ceramic honeycomb structural body, numeral 2 an outer peripheral wall, numeral 3 a cell wall, numeral 4 an open-ended cell defined by the cell walls 3, and numeral 4a an irregular open-ended cell.

When the cell wall contacts with the outer peripheral wall at a right angle, if the external pressure is applied to the outer peripheral wall, only a compression load is applied to the cell wall. As its reason, in the cell walls direction difficult to break at low level, the outside wall is rightly contact with the cell walls. On the other hand, when the lateral section of the ceramic honeycomb structural body having the square open-ended cells is circular or ellipsoidal, the irregular open-ended cells are always defined by the outer peripheral wall and the cell walls not perpendicular thereto in the vicinity of the outer peripheral wall. In the latter case, if the external pressure is applied to the outer peripheral wall, the compression load and bending load are applied to-the cell wall as shown in FIG. 2. Since a tensile stress at break in ceramics is only about 1/10 of compression stress at break, it has been confirmed that when the external pressure is applied to such a ceramic honeycomb structural body, the bending load including the above tensile stress is applied to the cell walls not perpendicular to the outer peripheral wall and hence the structural body is broken at a low level of the external pressure.

In the invention, therefore, the thickness of the cell wall constituting the irregular open-ended cell is thickened to mitigate the bending stress applied to such a cell wall, whereby the breakage of the structural body at the low external pressure level can be prevented. On the contrary, in the square open-ended cells located inside the structural body, all cell walls defining such an open-ended cell are rightly crossed to each other, so that a force applied from the outer peripheral wall is divided in the cell wall directions and hence only the compression stress is applied to such cell walls. As a result, the breakage of the cell walls defining the square open-ended cells is not caused even if the thickness of such a cell wall is made thinner.

In the shaping of the ceramic honeycomb structural body, if it is intended to make the thickness of the outer peripheral wall thicker than that of the cell wall, the extrusion resistance for the outer peripheral wall becomes small and the extrusion rate therefor becomes fast, and hence pressure is applied to the cell walls adjacent to the outer peripheral wall toward the center of the ceramic honeycomb structural body. As a result, the cell walls for the definition of the irregular open-ended cell not perpendicular to the outer peripheral wall are subjected to the bending stress likewise the case of FIG. 2, which is liable to cause deformation resulted in the lowering of the mechanical strength in the cell walls 3 of the irregular open-ended cells 4a as shown in FIG. 3. In the invention, however, such a deformation can be prevented by thickening the thickness of the cell wall defining the irregular open-ended cell.

In the ceramic honeycomb structural body, the thickness of the cell wall was conventionally 0.15–0.30 mm, but the cell wall thickness of 0.14 mm or 0.10 mm has recently been practiced. However, when the thickness of the cell wall is less than 0.15 mm, even if the thickness of the outer peripheral wall is about 0.5 mm likewise the conventional structural body having a cell wall thickness of 0.15–0.30 mm, the outer peripheral wall is apt to be chipped in the handling such as the housing of the structural body in the container for the catalyst converter or the like. The chipping is caused in a position of the outer peripheral wall not perpendicular to the cell wall or in a portion of the outer peripheral wall defining the irregular open-ended cell. This means that the absolute strength of the outer peripheral wall per se is insufficient and the chipping is apt to be caused even in the portions of the outer peripheral wall supported by the thin cell walls. In the invention, the thickness of the cell wall defining the irregular open-ended cell is made thicker to improve the mechanical strength, whereby the chipping is hardly caused.

Heretofore, in order to mechanically hold the ceramic honeycomb structural body 1 provided with a catalyst in the container 11 for the catalyst converter, as shown in FIG. 4b, a metal mesh 12 or a metal plate having an L-sectional shape is placed on a corner part of each end face of the structural body 1 to prevent the movement of the structural body 1 in an extending direction of the open-ended cell. In this structure, however, catalyst existing in a portion of the end face covered with the metal mesh 12 or metal plate cannot be utilized. In order to solve this problem, there is recently adopted a design that as shown in FIG. 4a, a metal mesh 13 is used instead of the L-shaped metal mesh 12 and the mechanical holding of the structural body is carried out only at the side face by the metal mesh 13 to flow the exhaust gas over a full end face of the ceramic honeycomb structural body 1 provided with the catalyst from a viewpoint of the effective utilization of the catalyst.

In general, the catalyst converter including the ceramic honeycomb structural body is larger in diameter than the exhaust pipe, so that both ends of the catalyst converter are tapered for the connection to the exhaust pipe. However, the tapering angle can not be made too gentle due to the restriction in the mounting. In case of such a tapered catalyst converter, the exhaust gas hardly passes through the outer peripheral portion even in the conventional ceramic honeycomb structural body having a uniform cell wall thickness. In the above-mentioned technique disclosed in JP-B-62-18797 and JP-B-61-60320, the thickness of all cell walls existing in the outer peripheral portion is made thick, so that the flowing of the exhaust gas becomes more difficult as compared with that of the conventional ceramic honeycomb structural body having a uniform cell wall thickness. Therefore, there is no meaning in the use of the technique disclosed in these articles to the structure of the catalyst converter as shown in FIG. 4a.

It is confirmed that the pressure loss of the honeycomb structural body is most dependent upon a hydraulic radius given by dividing a sectional area of open-ended cell by its inner periphery as shown by the following experimental equation (1):

$$P = (0.2091 \times L/D^2) + 63.93 \times (1-F)^2/F^2 + 0.95 \quad (1)$$

wherein P: pressure loss at a flow rate of 16 m/sec (mmH$_2$O)
L: full length of the honeycomb structural body (mm)
F: opening area ratio
D: hydraulic radius (mm).

Particularly, in the irregular open-ended cells having a triangle shape frequently seen when the angle defined by the outer peripheral wall and the cell wall is about 45°, the hydraulic radius is very small and the pressure loss is very large, so that the exhaust gas hardly flows even if the thickness of cell wall is not made thick. Therefore, even if the cell walls defining the irregular open-ended cell are thickened according to the invention, there is no influence on the flowing of the exhaust gas, so that the ceramic honeycomb structural body according to the invention is most preferable to be used in the structure of the catalyst converter as shown in FIG. 4a. Moreover, the sectional area of the irregular open-ended cell is less than about 80% of the sectional area of the regular open-ended cell having a square shape, considering that the flowing of the exhaust gas hardly occurs if the pressure loss becomes about two times.

As the ceramic material practically used at present, cordierite is selected from a viewpoint of the heat resistance and thermal shock resistance. Cordierite is usually used by combining natural material and industrial material, so that the outer dimension of the structural body made from cordierite changes in a range of several percentages in accordance with combination of starting material lots, scattering of manufacturing conditions and the like. In the catalyst converter for automobile, only the outer dimensional tolerance of 1–2% is generally acceptable in view of the holding in the container for the converter. In order to absorb such a tolerance, therefore, an extrusion die disclosed in JP-A-57-6722 as shown in FIG. 5 is used as an extrusion die for shaping the ceramic honeycomb structural body particularly having a cell wall thickness of less than 0.15 mm. In FIG. 5, the extrusion die 21 is composed of supply ports 22 for pottery body and slits 23 communicating therewith to extrude the honeycomb structural body 1 as shown in an upper portion of FIG. 5. The dimension of the outer shape of the structural body can be adjusted by setting masks 24 having different inner diameters at a back side of the extrusion die 21 in its extruding direction. This technique is applicable to the invention if the width of the slit corresponding to the cell wall defining the irregular open-ended cell is widened.

However, if it is intended to adjust the dimension of the outer shape of the honeycomb structural body disclosed in JP-B-5-41296 by using the extrusion die of the above structure, a size of a gradually increased portion of the cell walls also changes. In FIG. 5, when using the mask having an inner diameter A shown by a solid line, the gradually increased portion 25 is obtained, but when an inner diameter B shown by a phantom line is used so as to make the outer diameter of the honeycomb structural body small, the gradually increased portion is not formed. For this reason, if it is intended to adjust the dimension of the outer shape, there must be provided several kinds of the extrusion die, which becomes considerably uneconomical. Further, when the lateral section of the honeycomb structural body is circular or ellipsoidal, all of the cell walls contacting with the outer peripheral wall are different in the shape over a region corresponding to a quarter of the outer periphery, so that an electric discharge machining for the formation of the slits in the extrusion die, which has generally been conducted in the manufacture of the extrusion die as disclosed in JP-B-5-41296, cannot be conducted, and hence a mechanical machining is required instead of the electric discharge machining. As a result, the extrusion die cannot be machined in a high precision.

The following examples are given in illustration of the invention and are not intended as limitations thereof.

At first, there are provided ceramic honeycomb structural bodies as invention examples and comparative examples, each having a configuration of 106 mm in diameter and 150 mm in full length shown in FIG. 1a obtained by sintering an extrusion shaped body of cordierite material, and the number of cells (open-ended cells), cell wall thickness and thickness of outer peripheral wall as shown in Tables 1 and 2. In this case, Comparative Example 1 is a most standardly and widely used ceramic honeycomb structural body in which all of the cell walls defining the irregular open-ended cells in the outer peripheral portion and the square open-ended cells in the inner portion have the same thickness. In Comparative Examples 2–6, the thickness of the outer peripheral wall is varied by the adjustment in the shaping with the same extrusion die. In Comparative Example 7 is used an extrusion die having such slits that the cell wall thickness up to a second cell wall from the outer periphery is 0.15 mm and the cell wall thickness in the remaining cell walls is 0.11 mm. In Comparative Example 8 is used an extrusion die having such slits that the cell wall thickness up to the second cell wall from the outer periphery is 0.15 mm, and the cell wall thickness in third and fourth cell walls from the outer periphery is 0.13 mm and the cell wall thickness in the remaining cell walls is 0.11 mm. In Comparative Examples 9–24, the thickness of the outer peripheral wall is varied likewise Comparative Examples 2–5 and also the number of cells is changed. In Invention Examples 1–6 and the other invention examples, the thickness of the cell wall defining the irregular open-ended cell is thickened by widening the width of the slit corresponding to this cell wall in the extrusion die used in Comparative Examples 2–6 and also the thickness of the outer peripheral wall is varied by the adjustment in the shaping likewise these comparative examples.

With respect to all honeycomb structural bodies, the thickness of cell wall in the central portion, thickness of cell wall in the outer peripheral portion, thickness of cell wall defining the irregular open-ended cell and thickness of outer peripheral wall as well as pressure loss in the outer peripheral portion, external pressure at break and thermal shock resistance are measured to obtain results as shown in Tables 1 and 2. And also, the presence or absence of causing edge chipping and strength of the outer peripheral wall are measured in Comparative Examples 1–12 and Invention Examples 1–10.

Figure 6:
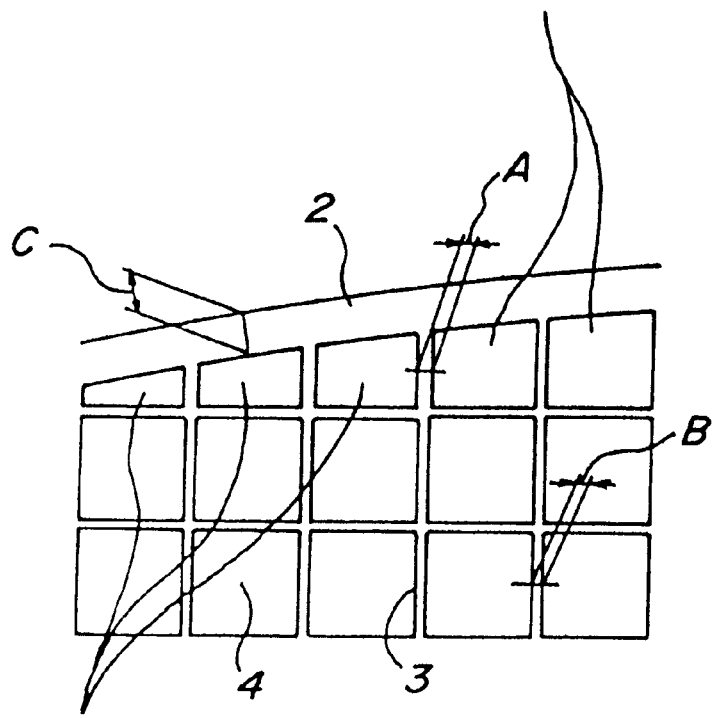
FIG. 6 is a partial schematic view illustrating positions of portions measured in the example.

The thickness of the cell wall is measured at a middle position of a length of one cell wall at lateral section of the honeycomb structural body. The thickness of cell wall in the central portion is represented by an average of four measured values in X-axis and Y-axis directions of the cell wall passing through the center at lateral section of the honeycomb structural body. Each of the thickness of cell wall in the outer peripheral portion and the thickness of the outer peripheral wall is represented by an average of the values measured at eight positions in X-axis and Y-axis directions and a middle position therebetween of the cell wall passing through the center at lateral section of the honeycomb structural body. The thickness of cell wall defining the irregular open-ended cell is represented by an average of the values measured at two positions on each of first to fourth quadrants when the directions of the cell wall passing through the center at lateral section of the honeycomb structural body are X-axis and Y-axis, respectively. The measurement is conducted twice to obtain an average thereof. An example of the measurement is shown in FIG. 6.

In the manufacture of the catalyst converter by an imitation test, it is examined whether or not the edge chipping is caused in the honeycomb structural body by transportation through a robot, movement onto a belt conveyer, contact with a metal pipe on the way of the conveying and fitting into a rubber plate through a robot. After five honeycomb structural bodies are tested, the evaluation of the edge chipping is classified into ○: no chipping in five bodies, Δ: occurrence of acceptable fine chipping, ▲: occurrence of unacceptable large chipping in one or more bodies, and ×: occurrence of unacceptable large chipping in three or more bodies.

Figure 7:
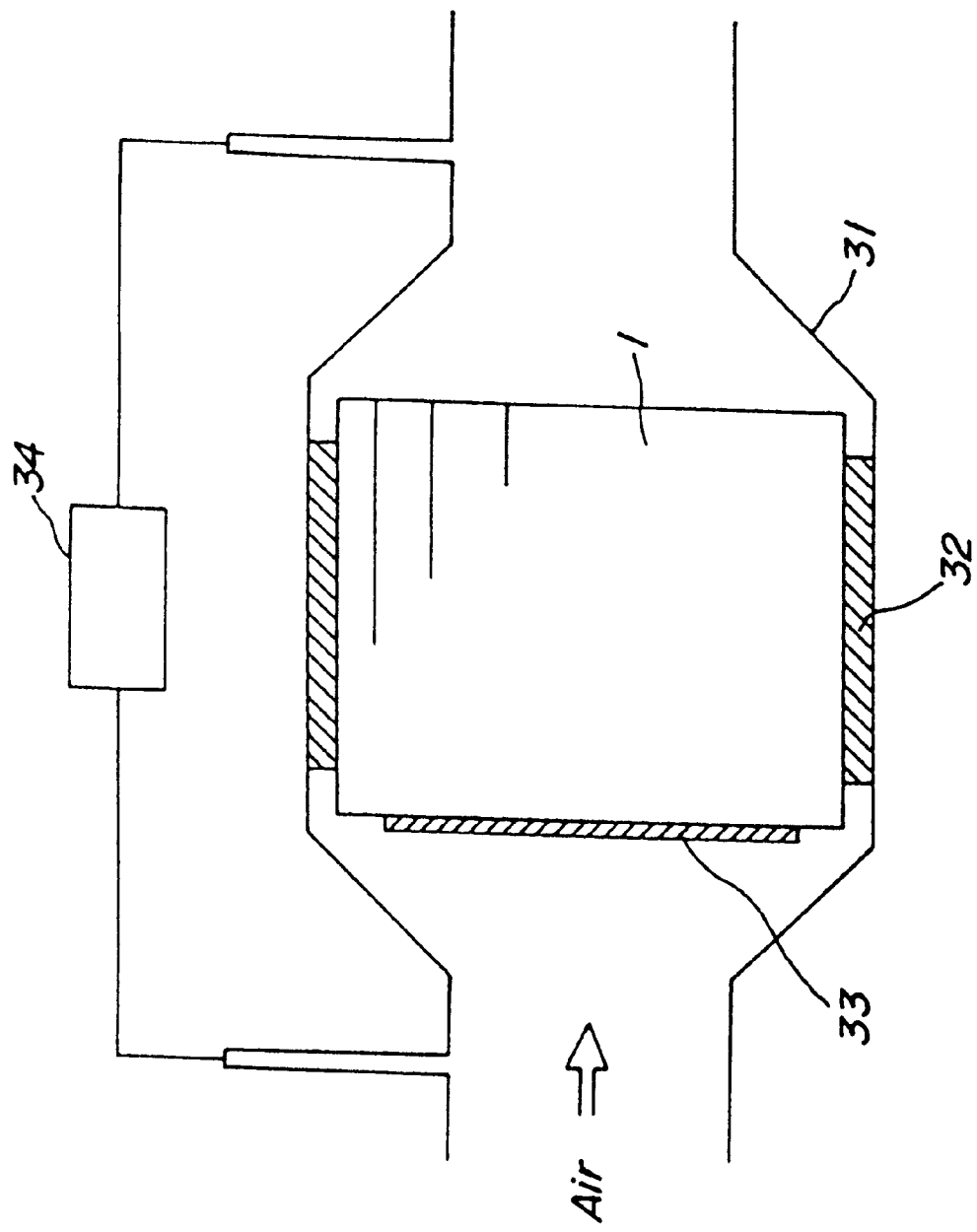
FIG. 7 is a schematic view illustrating a method of measuring pressure loss in an outer peripheral portion of the ceramic honeycomb structural body in the example.

The pressure loss in the outer peripheral portion is evaluated by applying a thick paper having a diameter of 93 mm onto an upstream end face of the honeycomb structural body so as not to pass air through the central portion of the structural body at lateral section, holding the thus assembled structural body in a container through a ceramic mat, and flowing air into the container to measure a pressure difference between an inlet and an outlet of the container by means of a pressure-drop manometer. The pressure loss is represented by an average of the values measured with respect to three bodies. An example of this measurement is shown in FIG. 7. In FIG. 7, numeral 31 is a container, numeral 32 a ceramic mat, numeral 33 a thick paper, and numeral 34 a pressure-drop manometer.

The strength of the outer peripheral wall is evaluated by placing the honeycomb structural body on a center of a ring-shaped neoprene rubber having an outer diameter of 108 mm, an inner diameter of 100 mm and a thickness of 3 mm and applying a load P to a top face of the structural body through an aluminum plate coated with a urethane sheet to measure a value of load causing the chipping of the outer peripheral wall in the structural body when the ring-shaped neoprene rubber escapes outward under compression. The strength is represented by an average of the values measured with respect to three bodies. An example of this measurement is shown in FIG. 8. In FIG. 8, numeral 41 is a ring-shaped neoprene rubber and numeral 42 an aluminum plate coated with a urethane sheet.

The external pressure at break is measured by applying an aluminum plate of about 20 mm in thickness onto each end face of the honeycomb structural body through a urethane sheet, airtightly sealing a side face of the structural body with a urethane tube, placing it into a pressure vessel and then increasing pressure until the breakage of the structural body. The external pressure is represented by an average of the values measured with respect to five bodies.

The thermal shock resistance is evaluated by a temperature value obtained by subtracting room temperature from an acceptable maximum temperature when the honeycomb structural body of room temperature is maintained in an electric furnace held at a temperature of room temperature +700° C. for 20 minutes and taken out therefrom on a refractory brick and lightly struck at its outer peripheral portion with a slender metal rod while observing its appearance to judge an acceptance case not observing cracks and developing a metallic sound and thereafter this procedure is repeated by raising the temperature of the electric furnace at a rate of 50° C. till the body becomes unacceptable. The thermal shock resistance is represented by an average of the values measured with respect to five bodies. These test results are shown in Tables 1 and 2.

TABLE 1

| Thickness of cell | Thickness of cell wall | Thickness of cell wall | Thickness | Pressure loss in |
|---|---|---|---|---|

| Item | Number of cells (k cpsm) | wall in central portion (mm) | in outer peripheral portion (mm) | defining irregular open-ended cell (mm) | of outer peripheral wall (mm) | Edge chipping | outer peripheral portion (mm H₂O) | Strength of outer peripheral wall (kN) | External pressure at break (MPa) | Thermal shock resistance (° C.) |
|---|---|---|---|---|---|---|---|---|---|---|
| Comparative Example 1 | 620 | 0.17 | 0.17 | 0.17 | 0.3 | ○ | 165 | 3.8 | 5.4 | 890 |
| Comparative Example 2 | 620 | 0.11 | 0.11 | 0.11 | 0.1 | X | 126 | 1.5 | 1.4 | 900 |
| Comparative Example 3 | | | | | 0.3 | X | 128 | 2.4 | 4.5 | 910 |
| Comparative Example 4 | | | | | 0.5 | ▲ | 127 | 3.5 | 4.9 | 880 |
| Comparative Example 5 | | | | | 0.7 | ○ | 127 | 5.1 | 5.3 | 800 |
| Comparative Example 6 | | | | | 0.9 | ○ | 128 | 4.9 | 3.1 | 760 |
| Comparative Example 7 | | | 0.15 | 0.15 | 0.5 | ○ | 135 | 5.5 | 6.0 | 900 |
| Comparative Example 8 | | | 0.15/0.13 | 0.15 | 0.5 | ○ | 144 | 5.7 | 5.5 | 880 |
| Invention Example 1 | | | 0.11 | 0.13 | 0.3 | Δ | 126 | 3.9 | 5.4 | 900 |
| Invention Example 2 | | | | 0.15 | | ○ | 126 | 4.2 | 7.6 | 900 |
| Invention Example 3 | | | | 0.17 | | ○ | 127 | 4.8 | 8.2 | 8.9 |
| Invention Example 4 | | | | 0.13 | 0.5 | ○ | 127 | 4.1 | 6.5 | 900 |
| Invention Example 5 | | | | 0.15 | | ○ | 127 | 5.2 | 7.7 | 910 |
| Invention Example 6 | | | | 0.17 | | ○ | 126 | 5.6 | 8.9 | 890 |
| Comparative Example 9 | 930 | 0.11 | 0.11 | 0.11 | 0.1 | X | 197 | 2.1 | 4.3 | 910 |
| Comparative Example 10 | | | | | 0.3 | ▲ | 196 | 3.2 | 7.5 | 900 |
| Comparative Example 11 | | | | | 0.5 | ▲ | 198 | 3.7 | 7.8 | 880 |
| Comparative Example 12 | | | | | 0.7 | Δ | 197 | 3.9 | 3.9 | 800 |
| Invention Example 7 | | | | 0.10 | 0.5 | ○ | 196 | 4.0 | 7.3 | 900 |
| Invention Example 8 | | | | 0.12 | | ○ | 198 | 4.4 | 8.1 | 910 |
| Invention Example 9 | | | | 0.14 | | ○ | 195 | 4.5 | 8.6 | 900 |
| Invention Example 10 | | | | 0.16 | | ○ | 195 | 4.9 | 7.6 | 900 |

TABLE 2

| Item | Number of cells (k cpsm) | Thickness of cell wall in central portion (mm) | Thickness of cell wall in outer peripheral portion (mm) | Thickness of cell wall defining irregular open-ended cell (mm) | Thickness of outer peripheral wall (mm) | Pressure loss in outer peripheral portion (mm H$_2$O) | External pressure at break (MPa) | Thermal shock resistance (° C.) |
|---|---|---|---|---|---|---|---|---|
| Comparative Example 13 | 620 | 0.08 | 0.08 | 0.8 | 0.1 | 119 | 1.6 | 900 |
| Comparative Example 14 | | | | | 0.3 | 120 | 1.8 | 900 |
| Comparative Example 15 | | | | | 0.5 | 120 | 2.3 | 900 |
| Comparative Example 16 | | | | | 0.7 | 120 | 1.7 | 890 |
| Invention Example 7 | | | | 0.10 | 0.3 | 120 | 2.0 | 900 |
| Invention Example 8 | | | | 0.12 | | 118 | 2.3 | 880 |
| Invention Example 9 | | | | 0.14 | | 120 | 2.5 | 900 |
| Invention Example 10 | | | | 0.16 | | 119 | 2.4 | 890 |
| Comparative Example 17 | 930 | 0.08 | 0.08 | 0.08 | 0.1 | 181 | 1.6 | 900 |
| Comparative Example 18 | | | | | 0.3 | 180 | 1.8 | 900 |
| Comparative Example 19 | | | | | 0.5 | 180 | 2.3 | 900 |
| Comparative Example 20 | | | | | 0.7 | 181 | 1.7 | 890 |
| Invention Example 11 | | | | 0.10 | 0.3 | 180 | 2.0 | 900 |
| Invention Example 12 | | | | 0.12 | | 180 | 2.3 | 880 |
| Invention Example 13 | | | | 0.14 | | 179 | 2.5 | 900 |
| Invention Example 14 | | | | 0.16 | | 179 | 2.4 | 890 |
| Comparative Example 21 | 1395 | 0.08 | 0.08 | 0.08 | 0.1 | 272 | 2.6 | 900 |
| Comparative Example 22 | | | | | 0.3 | 273 | 4.5 | 900 |
| Comparative Example 23 | | | | | 0.5 | 274 | 4.7 | 910 |
| Comparative Example 24 | | | | | 0.7 | 272 | 5.2 | 900 |
| Invention Example 15 | | | | 0.10 | 0.3 | 271 | 4.8 | 900 |
| Invention Example 16 | | | | 0.12 | | 270 | 6.0 | 910 |
| Invention Example 17 | | | | 0.14 | | 272 | 6.2 | 910 |
| Invention Example 18 | | | | 0.16 | | 270 | 6.1 | 910 |

As seen from the results of Table 1, the honeycomb structural bodies of Invention Examples 1–6 do not lower the external pressure at break and thermal shock resistance and do not cause the edge chipping and are low in the pressure loss of the outer peripheral portion as compared with the conventional honeycomb structural body having a uniform thickness of the cell wall (Comparative Example 1) and the honeycomb structural body having a thick cell wall in the outer peripheral portion (Comparative Examples 7 and 8) disclosed in JP-B-62-18797 and JP-B-61-60320. In the other examples in Tables 1 and 2, similar results can also be obtained. Therefore, the honeycomb structural bodies of the invention examples are found to be useful as compared with those of the comparative examples.

As seen from the above, according to the invention, the cell walls constituting the irregular open-ended cells in the outer peripheral portion of the ceramic honeycomb structural body are made thicker than the cell walls existing in the other portion and particularly the cell walls of the irregular open-ended cell not perpendicular to the outer peripheral wall are thickened, so that the bending stress applied to such cell walls can be mitigated and the breakage of the structural body at a low level of external pressure can be prevented. Furthermore, the deformation of the cell walls defining the irregular open-ended cells due to the external pressure can be prevented in the shaping of the ceramic honeycomb structural body. Moreover, there is substantially no influence on the pressure loss even in the thickening of the cell wall defining the irregular open-ended cell.

What is claimed is:

1. In a ceramic honeycomb structural body comprising a plurality of open-ended cells defined by an outer peripheral wall and many cell walls, the improvement wherein cell walls constituting irregular open-ended cells located near to the outer peripheral wall have a thickness thicker than those of the other remaining cell walls, and wherein the irregular open-ended cell having a sectional area corresponding to less than 80% of a sectional area of a regular open-ended cell is made thicker in the cell walls.

2. A ceramic honeycomb structural body according to claim 1, wherein only the cell walls not perpendicular to the outer peripheral wall in the irregular open-ended cell are made thicker than the remaining other cell walls.

3. A ceramic honeycomb structural body according to claim 1, wherein the outer peripheral wall has a thickness thicker than that of the cell wall constituting the irregular open-ended cell.

4. A ceramic honeycomb structural body according to claim 1, wherein the cell walls other than the cell wall constituting the irregular open-ended cell have a thickness of less than 0.15 mm.

* * * * *